(12) United States Patent
Li

(10) Patent No.: US 11,295,713 B1
(45) Date of Patent: Apr. 5, 2022

(54) FOLDABLE MUSICAL INSTRUMENT STAND AND MULTI-HEADED MUSICAL INSTRUMENT STAND

(71) Applicant: OFALA, INC., Alhambra, CA (US)

(72) Inventor: Muliang Li, Beijing (CN)

(73) Assignee: OFALA, INC., Alhambra, CA (US)

( * ) Notice: Subject to any disclaimer, the term of this patent is extended or adjusted under 35 U.S.C. 154(b) by 22 days.

(21) Appl. No.: 17/069,933

(22) Filed: Oct. 14, 2020

(30) Foreign Application Priority Data

Sep. 16, 2020 (CN) .......................... 202010973530.X

(51) Int. Cl.
  *G10G 5/00* (2006.01)
  *F16M 11/04* (2006.01)

(52) U.S. Cl.
  CPC ............. *G10G 5/00* (2013.01); *F16M 11/041* (2013.01)

(58) Field of Classification Search
  USPC ...... 248/122.1, 125.7, 441.1, 443, 447, 460, 248/463
  See application file for complete search history.

(56) References Cited

U.S. PATENT DOCUMENTS

| | | | | |
|---|---|---|---|---|
| 1,646,165 A * | 10/1927 | Naujoks | ................. | F16M 11/42 248/125.8 |
| 2,547,924 A * | 4/1951 | Citro | ....................... | G10G 5/00 84/327 |
| 5,383,634 A * | 1/1995 | Liao | ......................... | G10G 5/00 248/166 |
| 5,505,413 A * | 4/1996 | Hennessey | ............... | G10G 5/00 248/166 |
| 5,664,756 A * | 9/1997 | Liao | ......................... | G10G 5/00 248/443 |
| 5,744,735 A * | 4/1998 | Liao | ......................... | G10G 5/00 84/327 |
| 5,957,417 A * | 9/1999 | Yu | ............................ | G10G 5/00 248/166 |
| 5,959,225 A * | 9/1999 | Hsu | ......................... | G10G 5/00 84/327 |
| 6,283,421 B1 * | 9/2001 | Eason | ...................... | G10G 5/00 248/170 |
| 6,323,406 B1 * | 11/2001 | Park | ......................... | G10G 5/00 248/434 |

(Continued)

*Primary Examiner* — Monica E Millner

(57) ABSTRACT

A foldable musical-instrument stand comprises a fixing structure and a supporting structure. The supporting structure comprises a main supporting piece hinged with the fixing structure, first and second side supporting pieces, L-shaped first and second side connecting pieces, first and second brackets; two ends of the first and second side connecting pieces are respectively hinged with the main supporting piece and the first or second side supporting piece; long-edge terminals of the L-shaped first and second brackets are respectively hinged with the main supporting piece or hinged to the first and second side supporting pieces; first and second limiting pieces, respectively hinged with the first or second side supporting piece, are arranged on the first and second side supporting pieces; the main supporting piece, side supporting pieces, side connecting pieces, brackets and limiting pieces each have an opening position and a folding position. A multi-headed musical-instrument stand is also provided.

20 Claims, 7 Drawing Sheets

(56) References Cited

U.S. PATENT DOCUMENTS

| | | | | |
|---|---|---|---|---|
| 6,412,742 B1* | 7/2002 | Yu | ............................ | G10G 5/00 |
| | | | | 248/166 |
| 6,439,532 B1* | 8/2002 | Yu | ............................ | G10G 5/00 |
| | | | | 248/122.1 |
| 6,484,977 B1* | 11/2002 | Yu | ............................ | G10G 5/00 |
| | | | | 248/125.1 |
| 6,835,883 B2* | 12/2004 | Stevens | .................. | F16M 11/22 |
| | | | | 84/327 |
| 7,291,775 B2* | 11/2007 | Yu | ............................ | G10G 5/00 |
| | | | | 248/166 |
| 7,394,006 B2* | 7/2008 | Bordignon | ............... | G10G 5/00 |
| | | | | 248/443 |
| 7,470,843 B2* | 12/2008 | Hsieh | ....................... | G10G 5/00 |
| | | | | 84/327 |
| 7,717,377 B1* | 5/2010 | Corrado | ................... | G10G 5/00 |
| | | | | 248/150 |
| 8,967,585 B2* | 3/2015 | Furuta | ...................... | G10G 5/00 |
| | | | | 248/443 |
| 9,230,524 B2* | 1/2016 | Cortina | ..................... | F16B 2/10 |
| 9,377,158 B2* | 6/2016 | May | .......................... | G10G 5/00 |
| 10,900,606 B2* | 1/2021 | Gaines | ..................... | B62B 1/125 |
| 2006/0086869 A1* | 4/2006 | Hsieh | ................... | F16M 11/046 |
| | | | | 248/171 |
| 2010/0037747 A1* | 2/2010 | Hsieh | ....................... | G10G 5/00 |
| | | | | 84/327 |
| 2018/0005613 A1* | 1/2018 | Glasser | ................... | G10G 5/00 |

\* cited by examiner (a)

(b)

(c)

FOLDABLE MUSICAL INSTRUMENT STAND AND MULTI-HEADED MUSICAL INSTRUMENT STAND

CROSS REFERENCE TO RELATED APPLICATIONS

The present application claims the benefit of Chinese Patent Application No. 202010973530.X filed on Sep. 16, 2020, the contents of which are incorporated herein by reference in their entirety.

TECHNICAL FIELD

Embodiments of the present disclosure relate to a foldable musical instrument stand and a multi-headed musical instrument stand.

BACKGROUND ART

Appreciating music is a good way to release the mood and provide joys for our life. Performers can bring music enjoyment to people, whether in an indoor place such as a concert hall, a club, a music restaurant, or in an outdoor place such as a large outdoor concert or a temporary concert on a street or park.

When a performer performs in a non-fixed field without a stationary musical instrument stand, a portable musical instrument stand which is convenient to carry and store with him or her is needed in order to place a musical instrument when not played.

SUMMARY OF THE INVENTION

At least one embodiment of the present disclosure provides a foldable musical instrument stand comprising a fixing structure and a supporting structure, wherein the supporting structure comprises a main supporting piece, a first side supporting piece, a second side supporting piece, a first side connecting piece, a second side connecting piece, a first bracket and a second bracket; the main supporting piece is hinged with the fixing structure; two ends of the first side connecting piece are respectively hinged with the main supporting piece and the first side supporting piece; two ends of the second side connecting piece are respectively hinged with the main supporting piece and the second side supporting piece; the first bracket and the second bracket are both L-shaped, and are respectively hinged with the main supporting piece at long-edge terminals of the respective L-shapes, or the long-edge terminal of the L-shape of the first bracket is hinged to the first side supporting piece, and the long-edge terminal of the L-shape of the second bracket is hinged to the second side supporting piece; a first limiting piece hinged with the first side supporting piece is arranged at one end, far away from the first bracket, of the first side supporting piece, and a second limiting piece hinged with the second side supporting piece is arranged at one end, far away from the second bracket, of the second side supporting piece; and the main supporting piece, the first side supporting piece, the second side supporting piece, the first side connecting piece, the second side connecting piece, the first bracket, the second bracket, the first limiting piece and the second limiting piece each have an opening position and a folding position.

In some embodiments, the supporting structure further comprises a first auxiliary side connecting piece and a second auxiliary side connecting piece, two ends of the first auxiliary side connecting piece are respectively hinged with the main supporting piece and the first side supporting piece at positions different from the two ends of the first side connecting piece, and two ends of the second auxiliary side connecting piece are respectively hinged with the main supporting piece and the second side supporting piece at positions different from the two ends of the second side connecting piece.

In some embodiments, the main supporting piece further comprises a gravity self-locking structure, wherein the gravity self-locking structure comprises an elastic deformation part attached to the main supporting piece and a sliding part attached to the elastic deformation part, the sliding part can slide along a length direction of the main supporting piece, and the first bracket, the second bracket, the first auxiliary connecting piece and the second auxiliary connecting piece are respectively hinged to the sliding part; when a musical instrument is placed on the first bracket and the second bracket, the first bracket and the second bracket move downwards under the action of gravity of the musical instrument to drive the elastic deformation part to deform and the sliding part to move downwards so as to drive the first auxiliary connecting piece and the second auxiliary connecting piece to rotate, and thus the first limiting piece on the first side supporting piece and the second limiting piece on the second side supporting piece are moved towards a direction of the main supporting piece so as to lock a body of the musical instrument; and when the musical instrument is removed from the musical instrument stand, the elastic deformation part at least partially recovers from the deformation, so that the sliding part moves upwards to drive the first auxiliary connecting piece and the second auxiliary connecting piece to rotate in an opposite manner when the musical instrument is placed on the musical instrument stand, and thus the first limiting piece on the first side supporting piece and the second limiting piece on the second side supporting piece are moved towards a direction away from the main supporting piece so as to release the body of the instrument.

In some embodiments, the main supporting piece is a cylinder having a side wall and a cavity surrounded by the side wall, and one or more elongated openings extending in a length direction of the cylinder are formed in the side wall; the elastic deformation part and the sliding part of the gravity self-locking structure are arranged in the cavity, and the first bracket, the second bracket, the first auxiliary connecting piece and the second auxiliary connecting piece are hinged with the sliding part by the one or more elongated openings.

In some embodiments, the main supporting piece is a column, the elastic deformation part and the sliding part of the gravity self-locking structure are arranged outside the column, and the sliding part at least partially surrounds the periphery of the column.

In some embodiments, the elastic deformation part is one or more selected from a tension spring, a compression spring, at least one elastic metal strip or sheet, and at least one elastic rubber strip or sheet.

In some embodiments, the foldable musical instrument stand further comprises a slide rail arranged on the main supporting piece for engagement with the sliding part.

In some embodiments, the sliding part is one or more selected from a metal slide, a plastic slide, a nylon slide, a sliding bearing, and a rolling bearing.

In some embodiments, the fixing structure is one or more selected from a base, a connecting rod, and a hook.

In some embodiments, the base is one selected from a plate-type or leg-type base, wherein the leg-type base comprises a central connecting piece and at least three legs connected to the central connecting piece and extending radially outward from the central connecting piece, wherein the lengths of the at least three legs are substantially the same, and at least two of the at least three legs are hinged with the central connecting piece, and the main supporting piece is hinged to the central connecting piece.

In some embodiments, one or more locking structures are arranged at one or more of a joint of the fixing structure hinged with the main supporting piece, a joint of the first side connecting piece hinged with the main supporting piece, a joint of the first side connecting piece hinged with the first side supporting piece, a joint of the second side connecting piece hinged with the main supporting piece, a joint of the second side connecting piece hinged with the second side supporting piece, a joint of the first bracket hinged with the main supporting piece, a joint of the second bracket hinged with the main supporting piece, a joint of the first limiting piece hinged with the first side supporting piece, a joint of the second limiting piece hinged with the second side supporting piece, a joint of the leg hinged with the central connecting piece, a joint of the first auxiliary side connecting piece hinged with the main supporting piece, a joint of the first auxiliary side connecting piece hinged with the first side supporting piece, a joint of the second auxiliary side connecting piece hinged with the main supporting piece, a joint of the second auxiliary side connecting piece hinged with the second side supporting piece.

In some embodiments, at least one of the first limiting piece and the second limiting piece is L-shaped and hinged to at least one of the respective first side supporting piece and the second side supporting piece at the long-edge terminal of the L-shape.

In some embodiments, the foldable musical instrument stand further comprises an auxiliary supporting piece for against which the body of the musical instrument abuts, the auxiliary supporting piece is hinged with the main supporting piece and extends in the same direction as the first limiting piece and the second limiting piece, and the auxiliary supporting piece has a length less than the lengths of the first limiting piece and the second limiting piece.

In some embodiments, a bushing made of a flexible cushioning material is sleeved over at least one of the main supporting piece, the first bracket, the second bracket, the first limiting piece, and the second limiting piece.

In some embodiments, the musical instrument is one or more selected from guitar, Bass, ukulele, violin, viola, violoncello, double bass, Pipa, Ruan, Liuqin, Sanxian, Morin khuur, Dongbula.

At least one embodiment of the present disclosure also provides a multi-headed musical instrument stand comprising a plurality of foldable musical instrument stands as described in at least one embodiment of the present disclosure connected together in series by at least one connecting rod.

In some embodiments, the orientations of the plurality of foldable musical instrument stands are on the same line or on lines different from and parallel to each other.

BRIEF DESCRIPTION OF THE DRAWINGS

In order to explain technical solutions of embodiments of the present disclosure more clearly, the drawings of the embodiments will be briefly introduced below. Obviously, the drawings in the following description only relate to some embodiments of the present disclosure, and do not limit the present disclosure.

DETAILED DESCRIPTION OF THE INVENTION

Figure 1:
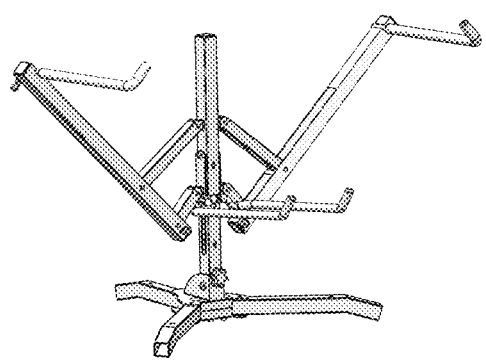
FIG. 1 is a schematic view of a fixing device that may be used in at least one embodiment of the present disclosure.
Figure 1:
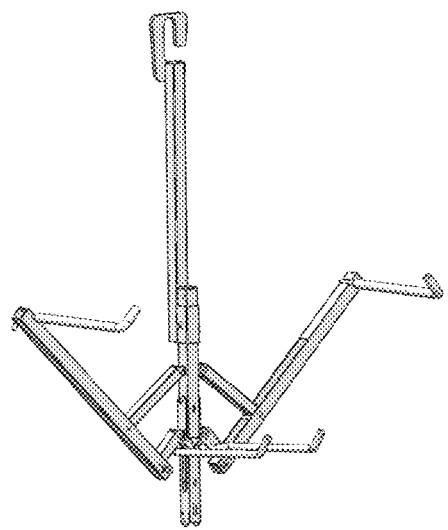
Figure 1:
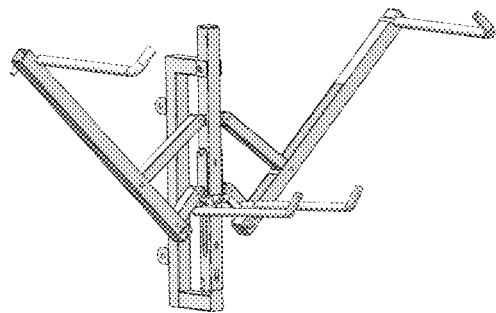

In order to make the objectives, technical solutions, and advantages of the embodiments of the present disclosure clearer, the technical solutions of the embodiments of the present disclosure will be described clearly and completely in conjunction with the accompanying drawings of the embodiments of the present disclosure. Obviously, it should be understood that the described embodiments are some, but not all, embodiments of the present disclosure. Based on the embodiments of the present disclosure, all other embodiments obtained by a person skilled in the art without involving any inventive effort are within the scope of the present disclosure. The shapes and sizes of parts in the drawings do not reflect the true proportions of parts, but are merely illustrative of the present disclosure.

Unless defined otherwise, technical or scientific terms used herein shall have the ordinary meaning as understood by a person skilled in the art to which this disclosure belongs. The terms "first", "second", and similar terms used in this disclosure do not denote any order, quantity, or importance, but rather are used solely to distinguish one from another. Likewise, the word "comprising" or "comprises", and the like, means that the presence of an element or item preceding the word encompasses the presence of an element or item listed after the word and equivalents thereof without excluding other elements or items. The terms "connecting" or "connected", and the like, are not limited to physical or mechanical connections, but may include electrical connections, whether direct connection or indirect connection. The terms "upper", "lower", "left", "right", and the like are used merely to indicate a relative positional relationship that may change accordingly when the absolute position of the object being described changes.

Musical instruments are delicate devices that are easily damaged and therefore need to be carefully placed on the instrument stands when not in use. Some performers not only need to perform in fixed locations, such as concert halls and clubs, but may also perform in non-fixed locations, such as outdoor concerts, streets, and parks, thus they require a portable musical instrument stand, such as, but not limited to, a foldable musical instrument stand, that is convenient to carry around and can reliably hold musical instruments.

A foldable musical instrument stand includes a bracket for supporting a bottom of the musical instrument and a supporting piece against which a body of the musical instrument abuts or a fork for locking a neck of the musical instrument, wherein one or more of the bracket, supporting piece or fork is foldable. Such a foldable musical instrument stand sometimes has a problem that the musical instrument body is easily dropped therefrom or the musical instrument placed thereon is not easily taken.

To solve the above and other problems, the present inventors have noted that it is possible to prevent the musical instrument from falling down by providing a limiting piece for restricting the movement of the body of the musical instrument while not interfering with the taking of the musical instrument.

At least one embodiment of the present disclosure provides a foldable musical instrument stand comprising a fixing structure and a supporting structure, wherein the supporting structure comprises a main supporting piece, a first side supporting piece, a second side supporting piece, a first side connecting piece, a second side connecting piece, a first bracket and a second bracket; the main supporting piece is hinged with the fixing structure; two ends of the first side connecting piece are respectively hinged with the main supporting piece and the first side supporting piece; two ends of the second side connecting piece are respectively hinged with the main supporting piece and the second side supporting piece; the first bracket and the second bracket are both L-shaped, and are respectively hinged with the main supporting piece at long-edge terminals of the respective L-shapes, or the long-edge terminal of the L-shape of the first bracket is hinged to the first side supporting piece, and the long-edge terminal of the L-shape of the second bracket is hinged to the second side supporting piece; a first limiting piece hinged with the first side supporting piece is arranged at one end, far away from the first bracket, of the first side supporting piece, and a second limiting piece hinged with the second side supporting piece is arranged at one end, far away from the second bracket, of the second side supporting piece; and the main supporting piece, the first side supporting piece, the second side supporting piece, the first side connecting piece, the second side connecting piece, the first bracket, the second bracket, the first limiting piece and the second limiting piece each have an opening position and a folding position.

In at least some examples of the above embodiments, a fixing device is used to fix the foldable musical instrument stand in use. For example, the fixing device may include, but is not limited to, one or more of a base, a connecting rod, or a hook.

FIG. 1 shows a schematic view of a fixing device that may be used in at least one embodiment of the present disclosure, and these examples include (a) a base, (b) a connecting rod, and (c) a hook.

For example, the base may be one selected from a plate-type or a leg-type base. The plate-type base can be a base formed by flat plates in the shapes of circles, triangles, rectangles and the like; the leg-type base includes a central connecting piece and at least three legs connected to the central connecting piece and extending radially outward from the central connecting piece, wherein the lengths of the at least three legs are substantially the same, and at least two of the at least three legs are hinged with the central connecting piece, and the main supporting piece is hinged to the central connecting piece. In use, at least a portion of the base contacts the plane and enables the instrument stand to stand upright relative to the plane, thereby fixing the instrument stand.

Further, the base may be formed of one or more of a metal, an alloy, engineered hard plastic, or a wood material having sufficient strength. For example, the material of the base may include, for example, a metallic material such as stainless steel, iron, copper, aluminum, and aluminum alloy, or one or more of ABS, PS, PMMA, PC, PET, and PBT. Further, a passivation layer, a plating layer or a coating layer, etc. may be provided on at least a portion of the base to improve surface properties thereof. The embodiments of the present disclosure are not limited in this respect.

For example, the connecting rod may be a removable fixing device with one end connected to the foldable musical instrument stand and the other end with, for example but not limited to, clamps, bolts, etc. Alternatively, for example, the connecting rod may be a straight rod bent at both ends toward and connected with the foldable musical instrument stand, with one or more detachable fixing devices such as, but not limited to, clamps, bolts, etc. on the straight rod. In use, the connecting rod is removably fixed to, for example, a wall surface or a crossbar or a vertical rod by the removable fixing device thereon, thereby fixing the musical instrument stand. In some examples, the fixing device may include, but is not limited to, clamps, bolts, etc. The embodiments of the present disclosure are not limited in this respect.

Further, the connecting rod may be formed of one or more of a metal, an alloy, an engineered hard plastic, or a wood material having sufficient strength. For example, the material of the connecting rod may include, for example, a metallic material such as stainless steel, iron, copper, aluminum, and aluminum alloy, or one or more of ABS, PS, PMMA, PC, PET, and PBT. Further, a passivation layer, a plating layer or a coating layer, etc. may be provided on at least a portion of the connecting rod to improve surface properties thereof. The embodiments of the present disclosure are not limited in this respect.

For example, the hook may have a hook body with the shape of similar question mark "Τ" and connected to the foldable musical instrument stand at a handle end of the question mark. In use, the hook is suspended from, for example but not limited to, a rod body or drawstring that is transverse in the air or another hook fixed to a wall surface, thereby fixing the musical instrument stand.

Further, the hook may be formed of one or more of a metal, an alloy, an engineered hard plastic, or a wood material having sufficient strength. For example, the material of the hook may include, for example, a metallic material such as stainless steel, iron, copper, aluminum, and aluminum alloy, or one or more of ABS, PS, PMMA, PC, PET, and PBT. Further, a passivation layer, a plating layer or a coating layer, etc. may be provided on at least a portion of the hook to improve a surface property thereof. The embodiments of the present disclosure are not limited in this respect.

FIG. 1 illustrates a fixing structure that may be used with at least one embodiment of the present disclosure, and embodiments of the present disclosure are not so limited. Other structures that may fix a foldable musical instrument stand relative to its placement position may also be used in embodiments of the present disclosure, not specifically enumerated herein.

In some examples of the above embodiments, the musical instruments may include, but are not limited to, those having a body and a neck connected to the body. For example, the musical instrument may include one or more selected from guitar, Bass, ukulele, violin, viola, violoncello, double bass, Pipa, Ruan, Liuqin, Sanxian, Morin khuur and Dongbula.

At least one embodiment of the present disclosure also provides a multi-headed musical instrument stand including a plurality of foldable musical instrument stands as described in at least one embodiment of the present disclosure connected together in series by at least one connecting rod.

Various embodiments of the present disclosure will now be described, respectively, with reference to the accompanying drawings. In the following embodiments, for the sake of simplicity, a fixing structure is used as a base, but the embodiments of the present disclosure are not limited to these examples.

Figure 2:
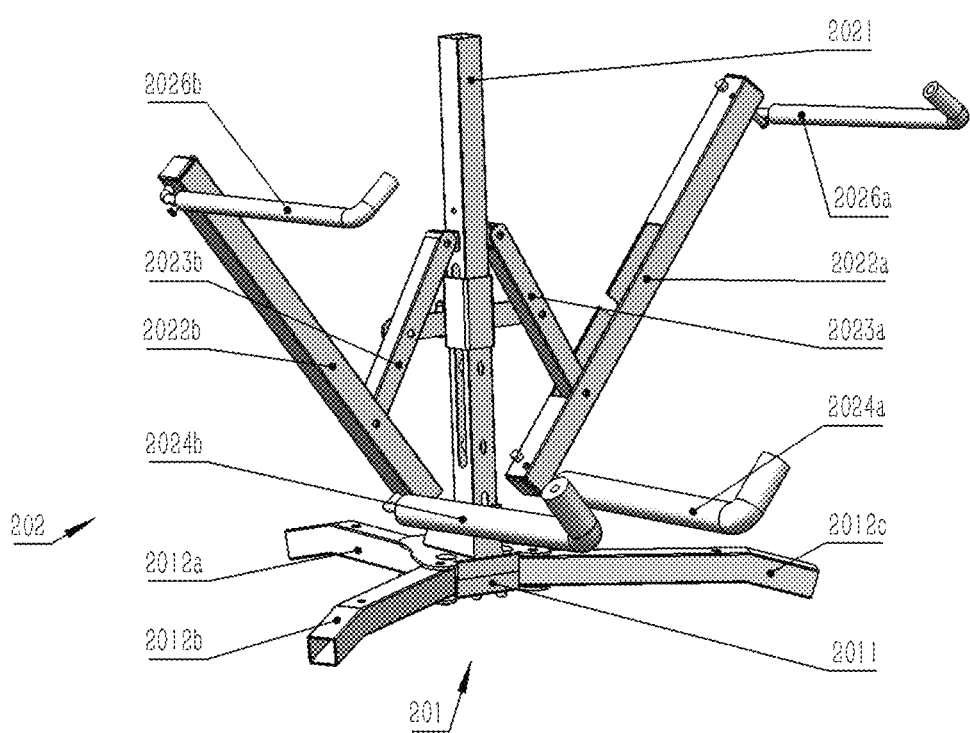
FIG. 2 is a schematic view of a foldable musical instrument stand according to one embodiment of the present disclosure.

FIG. 2 is a schematic view of a foldable musical instrument stand according to one embodiment of the present disclosure. As shown in FIG. 2, the foldable musical instrument stand includes a fixing structure 201 and a supporting structure 202. The fixing structure 201 is a leg-type base and includes a central connecting piece 2011, a first leg 2012a, a second leg 2012b, and a third leg 2012c, wherein at least two of the first leg 2012a, the second leg 2012b, and the third leg 2012c are hinged to the central connecting piece 2011. The supporting structure 202 includes a main supporting piece 2021, first and second side supporting pieces 2022a and 2022b, first and second side connecting pieces 2023a and 2023b, and first and second brackets 2024a and 2024b. The main supporting piece 2021 is hinged with the central connecting piece 2011 of the fixing structure 201; two ends of the first side connecting piece 2023a are respectively hinged with the main supporting piece 2021 and the first side supporting piece 2022a; two ends of the second side connecting piece 2023b are respectively hinged with the main supporting piece 2021 and the second side supporting piece 2022b; and the first bracket 2024a and the second bracket 2024b are both L-shaped, and are respectively hinged with the main supporting piece 2021 at long-edge terminals of the respective L-shapes. A first limiting piece 2026a hinged with the first side supporting piece 2022a is arranged at one end, far away from the first bracket 2024a, of the first side supporting piece 2022a, and a second limiting piece 2026b hinged with the second side supporting piece 2022b is arranged at one end, far away from the second bracket 2024b, of the second side supporting piece 2022b; and the main supporting piece 2021, the first side supporting piece 2022a, the second side supporting piece 2022b, the first side connecting piece 2023a, the second side connecting piece 2023b, the first bracket 2024a, the second bracket 2024b, the first limiting piece 2026a, and the second limiting piece 2026b each have an opening position and a folding position.

The central connecting piece 2011 is located at a substantially central position of the fixing structure 201 and is used to connect the first leg 2012a, the second leg 2012b, and the third leg 2012c to form a base for vertically standing the foldable musical instrument stand on a plane on which it is placed when in use. In the embodiment shown in FIG. 2, at least two of the first leg 2012a, the second leg 2012b, and the third leg 2012c are hinged with the central connecting piece 2011. However, in other embodiments of the present disclosure, it is also possible that all three of the first leg 2012a, the second leg 2012b, and the third leg 2012c are hinged with the central connecting piece 2011.

The first leg 2012a, the second leg 2012b, and the third leg 2012c are each independently substantially elongated parts having a cross-section such as, but not limited to, a circle or a rectangle, a first end of each of which is connected to the central connecting piece 2011 and a second end is in contact with a placement plane of the musical instrument stand, so that the musical instrument stand stands firmly and vertically when in use. The angles between any two of the first leg 2012a, the second leg 2012b, and the third leg 2012c may be the same or different. For example, but not limited, the angle between any two of the first leg 2012a, the second leg 2012b, and the third leg 2012c may be the same, i.e., about degrees; alternatively, the angles between the two legs in the first leg 2012a, the second leg 2012b, and the third leg 2012c are about 150 degrees, and the angles between the two legs and the third leg are about 105 degrees, respectively. The embodiments of the present disclosure are not limited in this respect.

Further, the second ends of one or more of the first leg 2012a, the second leg 2012b, and the third leg 2012c may be further provided with a high friction material such as a rubber pad or the like or a vacuum adsorption device such as a suction cup for more firmly attaching the legs to the placement plane of the musical instrument stand. The embodiments of the present disclosure are not limited in this respect.

The main supporting piece 2021 is a generally cylindrical part having, for example but not limited to, a circular or rectangular cross-section, and is hinged to the central connecting piece 2011 of the fixing structure 201. In some examples, the main supporting piece 2021, in the opening position, is generally perpendicular to a plane defined by the second ends of each of the first leg 2012a, the second leg 2012b, and the third leg 2012c. In embodiments of the present disclosure, "substantially perpendicular" generally means that the angle formed is at least 75 degrees to 90 degrees, e.g., 80 degrees to 90 degrees or 85 degrees to 90 degrees, and also, e.g., the angle formed is 90 degrees. The embodiments of the present disclosure are not so limited in this respect.

The first bracket 2024a and the second bracket 2024b may be substantially "L"-shaped rod-like parts having, for example but not limited to, a circular or rectangular cross-section, and are respectively hinged to the main supporting piece 2021 at the long-edge terminals of their respective L-shapes for supporting, in use, a musical instrument body placed on a foldable musical instrument stand. The lengths of the L-shaped long edges of the first bracket 2024a and the second bracket 2024b can be constant; alternatively, the length of the long edge of the L-shape may be adjustable to accommodate different sizes of instruments to be placed thereon. The embodiments of the present disclosure are not so limited in this respect.

The first side supporting piece 2022a, the second side supporting piece 2022b, the first side connecting piece 2023a, and the second side connecting piece 2023b are each independently substantially rod-like parts having, for example, but not limited to, a circular or rectangular cross-section. The first side connecting piece 2023a is hinged at both ends thereof with the main supporting piece 2021 and the first side supporting piece 2022a, respectively, so that the first side supporting piece 2022a is indirectly connected to the main supporting piece 2021; and the second side supporting piece 2023b is hinged at both ends thereof with the main supporting piece 2021 and the second side supporting piece 2022b, respectively, so that the second side supporting piece 2022b is indirectly connected to the main supporting piece 2021.

The first limiting piece 2026a and the second limiting piece 2026b may be substantially rod-like parts having, for example but not limited to, circular or rectangular crosssections. The first limiting piece 2026a is hinged to one end, far away from the first bracket 2024a, of the first side supporting piece 2022a; and the second limiting piece 2026b is hinged to one end, far away from the second bracket 2024b, of the second side supporting piece 2022b.

The volume of the foldable musical instrument stand tends to be reduced to facilitate storage when one or more of the first side supporting piece 2022a, the second side supporting piece 2022b, the first side connecting piece 2023a, the second side connecting piece 2023b, the first bracket 2024a, the second bracket 2024b, the first limiting piece 2026a, and the second limiting piece 2026b are in the folding position. When the first side supporting piece 2022a, the second side supporting piece 2022b, the first side connecting piece 2023a, the second side connecting piece 2023b, the first bracket 2024a, the second bracket 2024b, the first limiting piece 2026a, and the second limiting piece 2026b are in an opening position, the first side connecting piece 2023a and the second side connecting piece 2023b form a certain angle with the main supporting piece 2021 respectively, so that the first side supporting piece 2022a and the second side supporting piece 2022b are towards two sides respectively and far away from the main supporting piece 2021; and a certain angle is formed between the first side connecting piece 2023a and the first side supporting piece 2022a, and between the second side supporting piece 2022b and the second side connecting piece 2023b, respectively, so that the foldable musical instrument stand forms a butterfly wing-like shape. At this time, the first side supporting piece 2022a, the second side supporting piece 2022b, the first side supporting piece 2023a, the second side supporting piece 2023b, the first bracket 2024a, the second bracket 2024b, the first limiting piece 2026a, and the second limiting piece 2026b collectively constitute a space for placing the musical instrument.

In the embodiment shown in FIG. 2, the central connecting piece 2011, the first leg 2012a, the second leg 2012b, and the third leg 2012c in the fixing structure 201 and the main supporting piece 2021, the first side supporting piece 2022a, the second side supporting piece 2022b, the first side connecting piece 2023a, the second side connecting piece 2023b, the first bracket 2024a, the second bracket 2024b, the first limiting piece 2026a and the second limiting piece 2026b in the supporting structure 202 may each independently be formed of one or more of a metal, an alloy, or an engineered hard plastic having sufficient strength. For example, the materials of each of the above parts may each independently include, but are not limited to, a metallic material such as stainless steel, iron, copper, aluminum, and aluminum alloy, or one or more of ABS, PS, PMMA, PC, PET, and PBT. Further, a passivation layer, a plating layer or a coating layer, etc. may be provided on at least a portion of at least one of the central connecting piece 2011, the first leg 2012a, the second leg 2012b, the third leg 2012c, the main supporting piece 2021, the first side supporting piece 2022a, the second side supporting piece 2022b, the first side connecting piece 2023a, the second side connecting piece 2023b, the first bracket 2024a, the second bracket 2024b, the first limiting piece 2026a and the second limiting piece 2026b to improve a surface property thereof. The embodiments of the present disclosure are not limited in this respect.

In some examples of the embodiment shown in FIG. 2, a first leg 2012a, a second leg 2012b, and a third leg 2012c, as well as a main supporting piece 2021, a first side supporting piece 2022a, a second side supporting piece 2022b, a first side connecting piece 2023a, a second side connecting piece 2023b, a first bracket 2024a, a second bracket 2024b, the first limiting piece 2026a and the second limiting piece 2026b may each independently be a solid or hollow part, and are not limited by the embodiments of the present disclosure.

Further, in the embodiment shown in FIG. 2, a bushing made of a flexible cushioning material may be sleeved on one or more of the main supporting piece 2021, the first bracket 2024a, the second bracket 2024b, the first limiting piece 2026a, and the second limiting piece 2024b. For example, but not by way of limitation, the flexible cushioning materials may include foamed plastic, rubber, latex, elastomeric resins, and the like. The embodiments of the present disclosure are not limited in this respect.

In the embodiment shown in FIG. 2, a foot-type base having three legs is used as the fixing structure 201. However, in some other embodiments of the present disclosure, other structures capable of fixing a foldable musical instrument stand may be applied, such as, but not limited to, one or more selected from a leg-type base having more than three legs, a plate-type base, a hook, or a connecting rod.

In the embodiment shown in FIG. 2, the first bracket 2024a and the second bracket 2024b are hinged to the main supporting piece 2021. However, in some other embodiments of the present disclosure, the first bracket 2024a may be hinged to the first side supporting piece 2022a, and the second bracket 2024b hinged to the second side supporting piece 2022b.

In the embodiment shown in FIG. 2, one or more locking structures are arranged at one or more of a joint of the central connecting piece 2011 hinged with the main supporting piece 2021, a joint of the first side connecting piece 2023a hinged with the main supporting piece 2021, a joint of the first side connecting piece 2023a hinged with the first side supporting piece 2022a, a joint of the second side connecting piece 2023b hinged with the main supporting piece 2021, a joint of the second side connecting piece 2023b hinged with the second side supporting piece 2022b, a joint of the first bracket 2024a hinged with the main supporting piece 2021, a joint of the second bracket 2024b hinged with the main supporting piece 2021, a joint of the first limiting piece 2026a hinged with the first side supporting piece 2022a, a joint of the second limiting piece 2026b hinged with the second side supporting piece 2022b, a joint of the first leg 2012a hinged with the central connecting piece 2011, a joint of the second leg 2012b hinged with the central connecting piece 2011, a joint of the third leg 2012c hinged with the central connecting piece 2011 so as to improve the integral structural stability of the foldable musical instrument stand when in use.

The embodiment shown in FIG. 2 has at least the following advantages. The foldable musical instrument stand defines a space for placing the musical instrument body by matching the limiting piece with the main supporting piece and the bracket, the space providing good support for the musical instrument placed therein, thereby enabling the musical instrument to be securely placed on the musical instrument stand without being prone to accidental falling and simultaneously not influencing the taking of the musical instrument.

Figure 3:
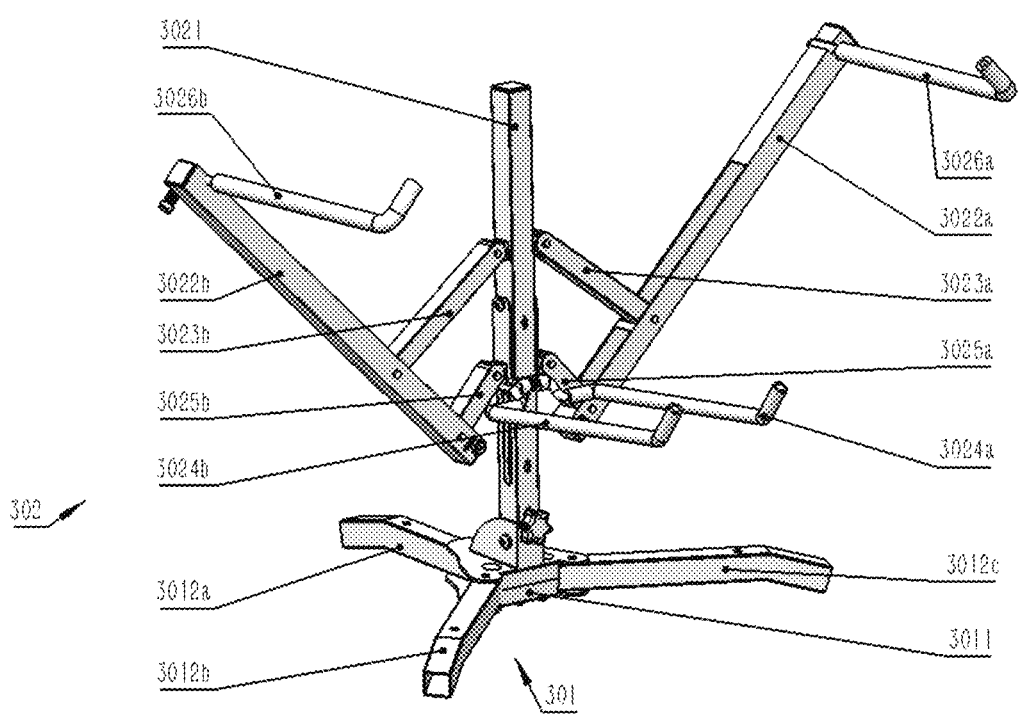
FIG. 3 is a schematic view of the foldable musical instrument stand according to another embodiment of the present disclosure.

FIG. 3 is a schematic view of a foldable musical instrument stand according to another embodiment of the present disclosure. As shown in FIG. 3, the foldable musical instrument stand includes a fixing structure 301 and a supporting structure 302. The fixing structure 301 is a leg-type base, and includes a central connecting piece 3011, a first leg 3012a, a second leg 3012b, and the third leg 3012c, wherein at least two of the first leg 3012a, the second leg 3012b, and the third leg 3012c are hinged to the central connecting piece 3011. The supporting structure 302 includes a main supporting piece 3021, first and second side supporting pieces 3022a and 3022b, first and second side connecting pieces 3023a and 3023b, first and second brackets 3024a and 3024b, and first and second auxiliary side connecting pieces 3025a and 3025b. The main supporting piece 3021 is hinged with the central connecting piece 3011 of the fixing structure 301; two ends of the first side connecting piece 3023a are respectively hinged with the main supporting piece 3021 and the first side supporting piece 3022a; two ends of the second side connecting piece 3023b are respectively hinged with the main supporting piece 3021 and the second side supporting piece 3022b; two ends of the first auxiliary side connecting piece 3025a are respectively hinged with the main supporting piece 3021 and the first side supporting piece 3022a at positions different from the two ends of the first side connecting piece 2023a; two ends of the second auxiliary side connecting piece 3025b are respectively hinged with the main supporting piece 3021 and the second side supporting piece 3022b at positions different from the two ends of the second side connecting piece 3023b; and the first bracket 3024a and the second bracket 3024b are both L-shaped, and are respectively hinged with the main supporting piece 3021 at the long-edge terminals of the respective L-shapes. A first limiting piece 3026a hinged with the first side supporting piece 3022a is arranged at one end, far away from the first bracket 3024a, of the first side supporting piece 3022a, and a second limiting piece 3026b hinged with the second side supporting piece 3022b is arranged at one end, far away from the second bracket 3024b, of the second side supporting piece 3022b; and the main supporting piece 3021, the first side supporting piece 3022a, the second side supporting piece 3022b, the first side connecting piece 3023a, the second side connecting piece 3023b, the first bracket 3024a, the second bracket 3024b, the first limiting piece 3026a, and the second limiting piece 3026b each have an opening position and a folding position.

The shapes and materials of the central connecting piece 3011, the first leg 3012a, a second leg 3012b, the third leg 3012c, the main supporting piece 3021, the first bracket 3024a, the second bracket 3024b, the first side supporting piece 3022a, the second side supporting piece 3022b, the first side connecting piece 3023a and the second side connecting piece 3023b, the first limiting piece 3026a and the second limiting piece 3026b of the embodiment shown in FIG. 3 are similar to those of the embodiment shown in FIG. 2 and will not be described in detail herein.

The first auxiliary side connecting piece 3025a and the second auxiliary side connecting piece 3025b are each independently substantially rod-shaped parts having, for example, but not limited to, a circular or rectangular cross-section. Two ends of the first auxiliary side connecting piece 3025a are respectively hinged with the main supporting piece 3021 and the first side supporting piece 3022a at a position different from the first side connecting piece 3023a; two ends of the second auxiliary side connecting piece 3025b are respectively hinged with the main supporting piece 3021 and the second side supporting piece 3022b at a position different from the second side connecting piece 3023b so as to improve the integral structural stability of the foldable musical instrument stand in use.

Further, the first auxiliary side connecting piece 3025a and the second auxiliary side connecting piece 3025b may each independently be formed of one or more of a metal, an alloy, or an engineered hard plastic having sufficient strength. For example, the materials of the first auxiliary side connecting piece 3025a and the second auxiliary side connecting piece 3025b may each independently include, but are not limited to, a metallic material such as stainless steel, iron, copper, aluminum, and aluminum alloy, or one or more of ABS, PS, PMMA, PC, PET, and PBT. Further, a passivation layer, a plating layer or a coating layer, etc. may be provided on at least a portion of at least one of the first auxiliary side connecting piece 3025a and the second auxiliary side connecting piece 3025b to improve a surface property thereof. The embodiments of the present disclosure are not limited in this respect.

In the embodiment shown in FIG. 3, the first auxiliary side connecting piece 3025a and the second auxiliary side connecting piece 3025b may each independently be a solid or hollow part, which is not limited by the embodiments of the present disclosure.

In the embodiment shown in FIG. 3, a foot-type base is used as the fixing structure 301. However, in some other embodiments of the present disclosure, other structures capable of fixing the foldable musical instrument stand may be applied, such as, but not limited to, a plate-type base, a hook, or a connecting rod.

In the embodiment shown in FIG. 3, one or more locking structures may be arranged at one or more of joints of the first auxiliary side connecting piece 3025a hinged with the main supporting piece 3021 and the first side supporting piece 3022a, respectively, and joints of the second auxiliary side connecting piece 3025b hinged with the main supporting piece 3021 and the second side supporting piece 3022b, respectively, to improve the integral structural stability of the foldable musical instrument stand in use.

The embodiment shown in FIG. 3 has at least the following advantages. The foldable musical instrument stand defines a space for placing the musical instrument body by matching the limiting piece with the main supporting piece and the bracket, the space providing good support for the musical instrument placed therein, thereby enabling the musical instrument to be securely placed on the musical instrument stand without being prone to accidental falling and simultaneously not influencing the taking of the musical instrument.

Figure 4:
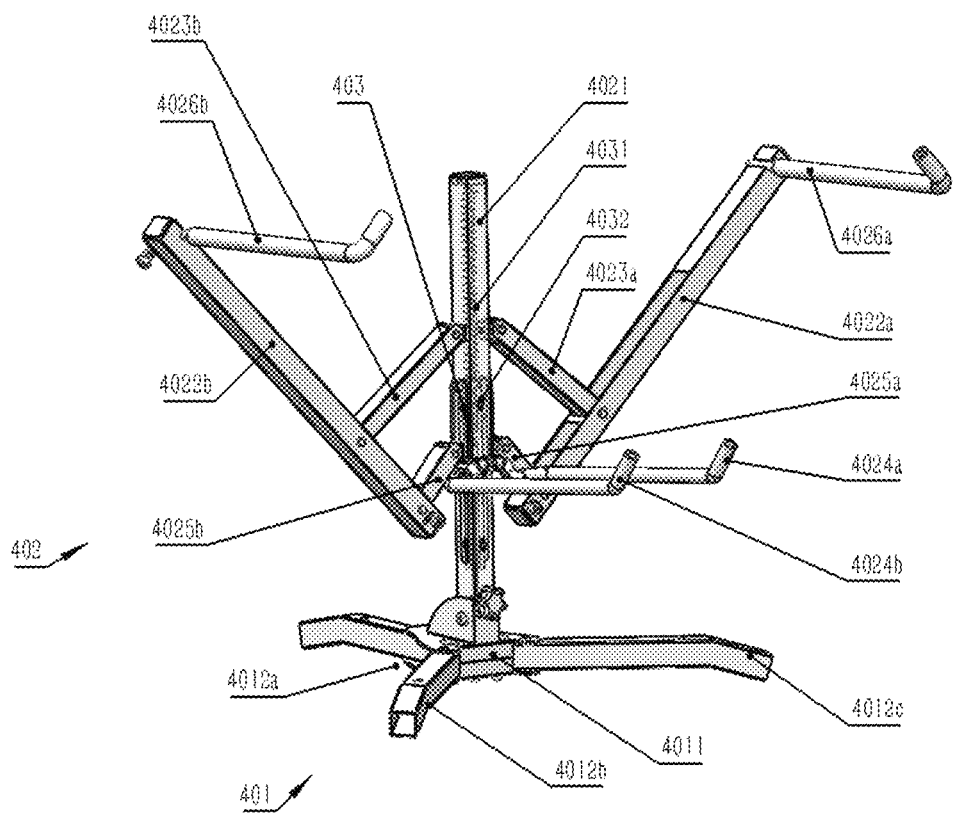
FIG. 4 is a schematic view of the foldable musical instrument stand according to yet another embodiment of the present disclosure.

FIG. 4 is a schematic view of a foldable musical instrument stand according to yet another embodiment of the present disclosure. As shown in FIG. 4, the foldable musical instrument stand includes a fixing structure 401, a supporting structure 402, and a gravity self-locking device 403.

The fixing structure 401 is a leg-type base and includes a central connecting piece 4011, a first leg 4012a, a second leg 4012b, and a third leg 4012c, wherein at least two of the first leg 4012a, the second leg 4012b, and the third leg 4012c are hinged to central connecting piece 4011.

The supporting structure 402 includes a main supporting piece 4021, first and second side supporting pieces 4022a and 4022b, first and second side connecting pieces 4023a and 4023b, first and second brackets 4024a and 4024b, and first and second auxiliary side connecting pieces 4025a and 4025b. The main supporting piece 4021 is a cylinder having a sidewall and a cavity surrounded by the sidewall, the cylinder having a first end hinged to the central connecting piece 4011 and a second end opposite to the first end. Two ends of the first side connecting piece 4023a are respectively hinged with the main supporting piece 4021 and the first side supporting piece 4022a; two ends of the second side connecting piece 4023b are respectively hinged with the main supporting piece 4021 and the second side supporting piece 4022b; two ends of the first auxiliary side connecting piece 4025a are respectively hinged with the main supporting piece 4021 and the first side supporting piece 4022a at positions different from the two ends of the first side connecting piece 2023a; two ends of the second auxiliary side connecting piece 4025b are respectively hinged with the main supporting piece 4021 and the second side supporting piece 4022b at positions different from the two ends of the second side connecting piece 4023b; and the first bracket 4024a and the second bracket 4024b are both L-shaped, and are respectively hinged with the main supporting piece 4021 at the long-edge terminals of the respective L-shapes. A first limiting piece 4026a hinged with the first side supporting piece 4022a is arranged at one end, far away from the first bracket 4024a, of the first side supporting piece 4022a, and a second limiting piece 4026b hinged with the second side supporting piece 4022b is arranged at one end, far away from the second bracket 4024b, of the second side supporting piece 4022b; and the main supporting piece 4021, the first side supporting piece 4022a, the second side supporting piece 4022b, the first side connecting piece 4023a, the second side connecting piece 4023b, the first bracket 4024a, the second bracket 4024b, the first limiting piece 4026a, and the second limiting piece 4026b each have an opening position and a folding position.

The gravity locking structure 403 includes an elastic deformation part 4031 and a sliding part 4032. As shown in FIG. 4, both the elastic deformation part 4031 and the sliding part 4032 are arranged in the cavity of the main supporting piece 4021, and two ends of the elastic deformation part 4031 are connected with the first end of the main supporting piece 4021 and the sliding part 4032, respectively. Three elongated openings extending along the length of the cylinder are arranged in the side wall of the main supporting piece 4021. In the three elongated openings, two are located on the same side of the first auxiliary-side connecting piece 4025a and the second auxiliary-side connecting piece 4025b, respectively, and the other is located on the same side of the first bracket 4024a and the second bracket 4024b. The first bracket 4024a, the second bracket 4024b, the first auxiliary connecting piece 4025a, and the second auxiliary connecting piece 4025b are respectively hinged to the sliding part 4032 by corresponding openings.

When a musical instrument is placed on the first bracket 4024a and the second bracket 4024b, the first bracket 4024a and the second bracket 4024b move downwards under the action of gravity of the musical instrument, the elastic deformation part 4031 is deformed, the sliding part 4032 moves downwards, and the first auxiliary connecting piece 4025a and the second auxiliary connecting piece 4025b are driven to rotate. Therefore, the first limiting piece 4026a on the first side supporting piece 4022a and the second limiting piece 4026b on the second side supporting piece 4022b move toward the main supporting piece 4021 to lock the body of the musical instrument. When the musical instrument is removed from the musical instrument stand, the elastic deformation part 4031 at least partially recovers from the deformation, so that the sliding part 4032 moves upwards to drive the first auxiliary connecting piece 4025a and the second auxiliary connecting piece 4025b to rotate in an opposite manner when the musical instrument is placed on the musical instrument stand, and thus the first limiting piece 4026a on the first side supporting piece 4022a and the second limiting piece 4026b on the second side supporting piece 4022b are moved towards a direction away from the main supporting piece 4021 so as to release the body of the musical instrument.

The shapes and materials of the central connecting piece 4011, the first leg 4012a, the second leg 4012b, the third leg 4012c, the first side supporting piece 4022a, the second side supporting piece 4022b, the first side connecting piece 4023a, the second side connecting piece 4023b, the first bracket 4024a, the second bracket 4024b, the first auxiliary side connecting piece 4025a, the second auxiliary side connecting piece 4025b, the first limiting piece 4026a, and the second limiting piece 4026b as well as the main supporting piece 4021 of the embodiment shown in FIG. 4 are all similar to those of the embodiment shown in FIG. 3 and will not be described in detail herein.

In the embodiment shown in FIG. 4, the elastic deformation part 4031 is a tension spring and is attached to the main supporting piece 4021 at a second end remote from the central connecting piece 4011. However, in some other embodiments of the present disclosure, the elastic deformation part 4031 may be other elastically deformable materials or structures and/or attached to the main supporting piece 4021 at other locations. For example, but not limited to, the elastic deformation part 4031 may also be one or more selected from a compression spring attached to the main supporting piece 4021 near the first end of the central connecting piece 4011, at least one elastic metal strip or sheet attached to the first end or the second end or the middle of the main supporting piece 4021, or at least one elastic rubber strip or sheet attached to the first end and/or the second end of the main supporting piece 4021, etc.

In the embodiment shown in FIG. 4, the sliding part 4032 is a sliding bearing. However, in some other embodiments of the present disclosure, the sliding part 4032 may also be any sliding part capable of sliding along the length of the main supporting piece 4021, such as, but not limited to, one or more selected from a metal slide, a plastic slide, a nylon slide, and a rolling bearing. In some examples, a slide rail cooperating with the sliding part 4032 may also be arranged on the inner wall of the cavity of the main supporting piece 4021 to make the sliding of the sliding part 4032 smoother.

In the embodiment shown in FIG. 4, three openings are formed in the side wall of the main supporting piece 4021, and the first bracket 4024a, the second bracket 4024b, the first auxiliary connecting piece 4025a, and the second auxiliary connecting piece 4025b are hinged with the sliding part 4032 in the main supporting piece 4021 by one of the three openings, respectively. However, in some other embodiments of the present disclosure, more or fewer openings may be formed in the sidewall of the main supporting piece 4021. The embodiments of the present disclosure are not limited in this respect.

The embodiment shown in FIG. 4 has at least the following advantages. The foldable musical instrument stand uses the limiting piece to cooperate with the main supporting piece and the bracket to define a space for placing the body of the musical instrument, the space providing good support for the musical instrument placed therein, thereby enabling the musical instrument to be securely placed on the musical instrument stand without being prone to accidental falling and simultaneously not influencing the taking of the musical instrument. In addition, a gravity self-locking structure is also used in the foldable musical instrument stand to better fix the musical instrument placed thereon in use.

Figure 5:
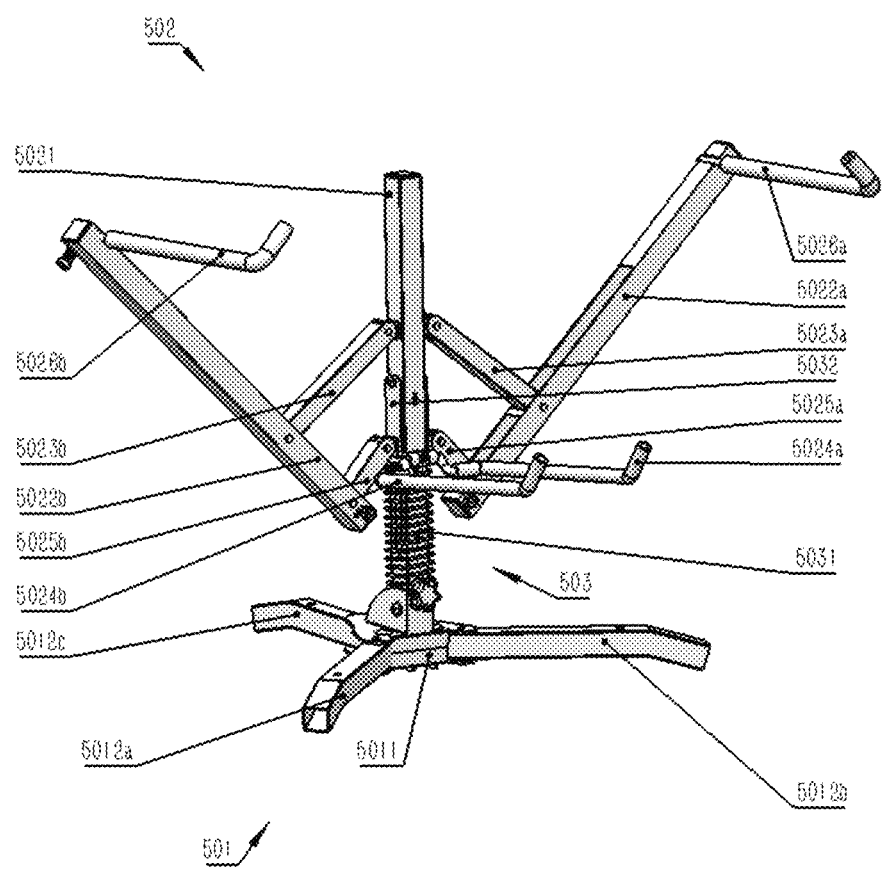
FIG. 5 is a schematic view of the foldable musical instrument stand according to still another embodiment of the present disclosure.

FIG. 5 is a schematic view of a foldable musical instrument stand according to yet another embodiment of the present disclosure. As shown in FIG. 5, the foldable musical instrument stand includes a fixing structure 501, a supporting structure 502, and a gravity self-locking device 503.

The fixing structure 501 is a leg-type base and includes a central connecting piece 5011, a first leg 5012*a*, a second leg 5012*b*, and a third leg 5012*c*, wherein at least two of the first leg 5012*a*, the second leg 5012*b*, and the third leg 5012*c* are hinged to the central connecting piece 5011.

The supporting structure 502 includes a main supporting piece 5021, first and second side supporting pieces 5022*a* and 5022*b*, first and second side connecting pieces 5023*a* and 5023*b*, first and second brackets 5024*a* and 5024*b*, and first and second auxiliary side connecting pieces 5025*a* and 5025*b*. The main supporting piece 5021 is a main body and has a first end hinged to the central connecting piece 5011 and a second end opposite to the first end. Two ends of the first side connecting piece 5023*a* are respectively hinged with the main supporting piece 5021 and the first side supporting piece 5022*a*; two ends of the second side connecting piece 5023*b* are hinged with the main supporting piece 5021 and the second side supporting piece 5022*b* respectively; two ends of the first auxiliary side connecting piece 5025*a* are respectively hinged with the main supporting piece 5021 and the first side supporting piece 5022*a* at positions different from the two ends of the first side connecting piece 2023*a*; two ends of the second auxiliary side connecting piece 5025*b* are respectively hinged with the main supporting piece 5021 and the second side supporting piece 5022*b* at positions different from the two ends of the second side connecting piece 5023*b*; and the first bracket 5024*a* and the second bracket 5024*b* are both L-shaped and hinged with the main supporting piece 5021 at the long-edge terminals of the respective L-shapes. A first limiting piece 5026*a* hinged with the first side supporting piece 5022*a* is arranged at one end, far away from the first bracket 5024*a*, of the first side supporting piece 5022*a*, and a second limiting piece 5026*b* hinged with the second side supporting piece 5022*b* is arranged at one end, far away from the second bracket 5024*b*, of the second side supporting piece 5022*b*; and the main supporting piece 5021, the first side supporting piece 5022*a*, the second side supporting piece 5022*b*, the first side connecting piece 5023*a*, the second side connecting piece 5023*b*, the first bracket 5024*a*, the second bracket 5024*b*, the first limiting piece 5026*a*, and the second limiting piece 5026*b* each have an opening position and a folding position.

The gravity locking structure 503 includes an elastic deformation part 5031 and a sliding part 5032. As shown in FIG. 5, the elastic deformation part 5031 and the sliding part 5032 are arranged around the cylinder of the main supporting piece 5021, and two ends of the elastic deformation part 5031 are connected with the first end of the main supporting piece 5021 and the sliding part 5032, respectively. The first bracket 5024*a*, the second bracket 5024*b*, the first auxiliary connecting piece 5025*a*, and the second auxiliary connecting piece 5025*b* are hinged to the sliding part 5032, respectively.

When a musical instrument is placed on the first bracket 5024*a* and the second bracket 5024*b*, the first bracket 5024*a* and the second bracket 5024*b* move downwards under the action of gravity of the musical instrument, the elastic deformation part 5031 is deformed, the sliding part 5032 moves downwards, and the first auxiliary connecting piece 5025*a* and the second auxiliary connecting piece 5025*b* are driven to rotate. Therefore, the first limiting piece 5026*a* on the first side supporting piece 5022*a* and the second limiting piece 5026*b* on the second side supporting piece 5022*b* move toward the main supporting piece 5021 to lock the body of the musical instrument. When the musical instrument is removed from the musical instrument stand, the elastic deformation part 5031 at least partially recovers from the deformation, so that the sliding part 5032 moves upward to drive the first auxiliary connecting piece 5025*a* and the second auxiliary connecting piece 5025*b* to rotate in an opposite manner when the instrument is placed on the instrument stand, and thus the first limiting piece 5026*a* on the first side supporting piece 5022*a* and the second limiting piece 5026*b* on the second side supporting piece 5022*b* are moved towards a direction away from the main supporting piece 5021 so as to release the body of the musical instrument.

The shapes and materials of the central connecting piece 5011, the first leg 5012*a*, the second leg 5012*b*, the third leg 5012*c*, the first side supporting piece 5022*a*, the second side supporting piece 5022*b*, the first side connecting piece 5023*a*, the second side connecting piece 5023*b*, the first bracket 5024*a*, the second bracket 5024*b*, the first auxiliary side connecting piece 5025*a*, the second auxiliary side connecting piece 5025*b*, the first limiting piece 5026*a* and the second limiting piece 5026*b* as well as the main supporting piece 5021 of the embodiment shown in FIG. 5 are similar to those of the embodiment shown in FIG. 3 and will not be described in detail herein.

In the embodiment shown in FIG. 5, the elastic deformation part 5031 is a compression spring and is attached to the main supporting piece 5021 at a first end remote from the central connecting piece 5011. However, in some other embodiments of the present disclosure, the elastic deformation part 5031 may be other elastically deformable materials or structures and/or attached to the main supporting piece 5021 at other locations. For example, but not limited, the elastic deformation part 5031 may also be one or more selected from a tension spring attached to the main supporting piece 5021 at a second end remote from the central connecting piece 5011, at least one elastic metal strip or sheet attached to the first end or the second end or the middle of the main supporting piece 5021, or at least one elastic rubber strip or sheet attached to the first end and/or the second end of the main supporting piece 5021, etc.

In the embodiment shown in FIG. 5, the sliding part 5032 is a sleeve-type PTFE slide. However, in some other embodiments of the present disclosure, the sliding part 5032 may also be any sliding part capable of sliding along the length of the main supporting piece 5021, such as, but not limited to, one or more selected from a metal slide, a plastic slide, a nylon slide, a sliding bearing, and a rolling bearing. In some examples, a slide rail cooperating with the sliding part 5032 may also be arranged on the outer wall of the column of the main supporting piece 5021 to make the sliding of the sliding part 5032 smoother.

The embodiment shown in FIG. 5 has at least the following advantages. The foldable musical instrument stand defines a space for placing the musical instrument body by matching the limiting piece with the main supporting piece and the bracket, the space providing good support for the musical instrument placed therein, thereby enabling the musical instrument to be securely placed on the musical instrument stand without being prone to accidental falling and simultaneously not influencing the taking of the musical instrument. In addition, a gravity self-locking structure is also used in the foldable musical instrument stand to better fix the musical instrument placed thereon in use.

Figure 6:
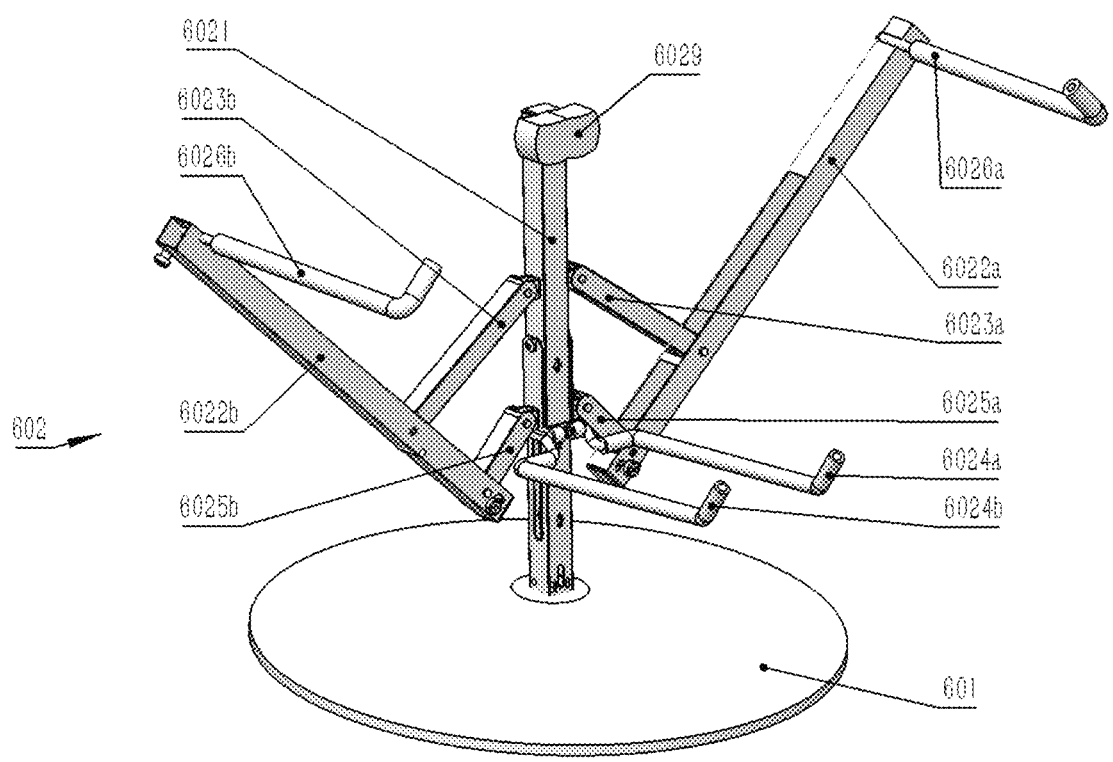
FIG. 6 is a schematic view of a foldable musical instrument stand according to a further embodiment of the present disclosure.

FIG. 6 is a schematic view of a foldable musical instrument stand according to yet another embodiment of the present disclosure. As shown in FIG. 6, the foldable musical instrument stand includes a fixing structure 601 and a supporting structure 602. The fixing structure 601 is a plate-type base. The supporting structure 602 includes a main supporting piece 6021, first and second side supporting pieces 6022a and 6022b, first and second side connecting pieces 6023a and 6023b, first and second brackets 6024a and 6024b, first and second auxiliary side connecting pieces 6025a and 6025b, and an auxiliary supporting piece 6029. The main supporting piece 6021 is hinged with the central connecting piece 6011 of the fixing structure 601; two ends of the first side connecting piece 6023a are respectively hinged with the main supporting piece 6021 and the first side supporting piece 6023a; two ends of the second side connecting piece 6023b are respectively hinged with the main supporting piece 6021 and the second side supporting piece 6022b; two ends of the first auxiliary side connecting piece 6025a are respectively hinged with the main supporting piece 6021 and the first side supporting piece 6022a at positions different from the two ends of the first side connecting piece 6023a; two ends of the second auxiliary side connecting piece 6025b are respectively hinged with the main supporting piece 6021 and the second side supporting piece 6022b at positions different from the two ends of the second side connecting piece 6023b; and the first bracket 6024a and the second bracket 6024b are both L-shaped, and are respectively hinged with the main supporting piece 6021 at the long-edge terminals of the respective L-shapes. The auxiliary supporting piece 6029 is hinged to the main supporting piece 6021 and extends in the same direction as the first limiting piece 6026a and the second limiting piece 6026b. The length of the auxiliary supporting piece 6029 is less than the lengths of the first limiting piece 6026a and the second limiting piece 6026b. A first limiting piece 6026a hinged with the first side supporting piece 6022a is arranged at one end, far away from the first bracket 6024a, of the first side supporting piece 6022a, and a second limiting piece 6026b hinged with the second side supporting piece 6022b is arranged at one end, far away from the second bracket 6024b, of the second side supporting piece 6022b; and the main supporting piece 6021, the first side supporting piece 6022a, the second side supporting piece 6023b, the first side connecting piece 6023a, the second side connecting piece 6023b, the first bracket 6024a, the second bracket 6024b, the first limiting piece 6026a, and the second limiting piece 6026b each have an opening position and a folding position.

The shapes and materials of the main supporting piece 6021, the first and second side supporting pieces 6022a and 602b, the first and second side connecting pieces 6023a and 6023b, the first and second brackets 6024a and 6024b, the first and second auxiliary side connecting pieces 6025a and 6025b, the first limiting piece 6026a and the second limiting piece 6026b of the embodiment shown in FIG. 6 are similar to those of the embodiment shown in FIG. 3 and will not be described in detail herein.

The auxiliary supporting piece 6029 has a connecting portion hinged with the main supporting piece 6021 and a supporting portion against which the instrument body abuts. The supporting portion may include, for example, but not limited to, a plane in contact with the body of the instrument or a surface with a plurality of protrusions.

In some examples, the connecting portion and the supporting portion of the auxiliary supporting piece 6029 may each independently comprise one or more selected from a metal, an alloy, or an engineered hard plastic. For example, the material of the connecting portion may include, but is not limited to, a metal material selected from stainless steel, iron, copper, aluminum, aluminum alloy, and the like; and the material of the supporting portion may include, but is not limited to, a metal material selected from stainless steel, iron, copper, aluminum, aluminum alloy, etc. or one or more of ABS, PS, PMMA, PC, PET, and PBT. Further, a passivation layer, a plating layer, a coating layer, etc. may be provided on at least a portion of the connecting portion to improve a surface property thereof; and a high friction material such as a rubber pad or the like or a vacuum adsorption device such as a suction cup may also be provided on at least a portion of the supporting portion. The embodiments of the present disclosure are not limited in this respect.

In the embodiment shown in FIG. 6, a plate-type base is used as the fixing structure 601. However, in some other embodiments of the present disclosure, other structures capable of fixing the foldable musical instrument stand may be applied, such as, but not limited to a leg-type base, a hook, or a connecting rod.

In the embodiment shown in FIG. 6, one or more locking structures may be arranged at one or more of joints of the first auxiliary side connecting piece 6025a hinged with the main supporting piece 6021 and the first side supporting piece 6022a, respectively, and joints of the second auxiliary side connecting piece 6025b hinged with the main supporting piece 6021 and the second side supporting piece 6022b, respectively, to improve the integral structural stability of the foldable musical instrument stand in use.

Further, in the embodiment shown in FIG. 6, a bushing made of a flexible cushioning material may also be sleeved on one or more of the main supporting piece 6021, the first bracket 6024a, the second bracket 6024b, the first limiting piece 6026a, and the second limiting piece 6026b. For example, but not by way of limitation, the flexible cushioning materials may include foamed plastic, rubber, latex, elastomeric resins, and the like. The embodiments of the present disclosure are not limited in this respect.

The embodiment shown in FIG. 6 has at least the following advantages. The foldable musical instrument stand defines a space for placing a musical instrument body by matching the limiting piece with the main supporting piece and the bracket, and applies the auxiliary supporting piece for abutting the body of the musical instrument, thereby providing good support for the musical instrument, and thus enabling the musical instrument to be securely placed on the musical instrument stand without being prone to accidental falling and simultaneously not influencing the taking of the musical instrument.

At least one embodiment of the present disclosure also provides a multi-headed musical instrument stand including a plurality of foldable musical instrument stands as described in at least one embodiment of the present disclosure connected together in series by at least one connecting rod.

Figure 7:
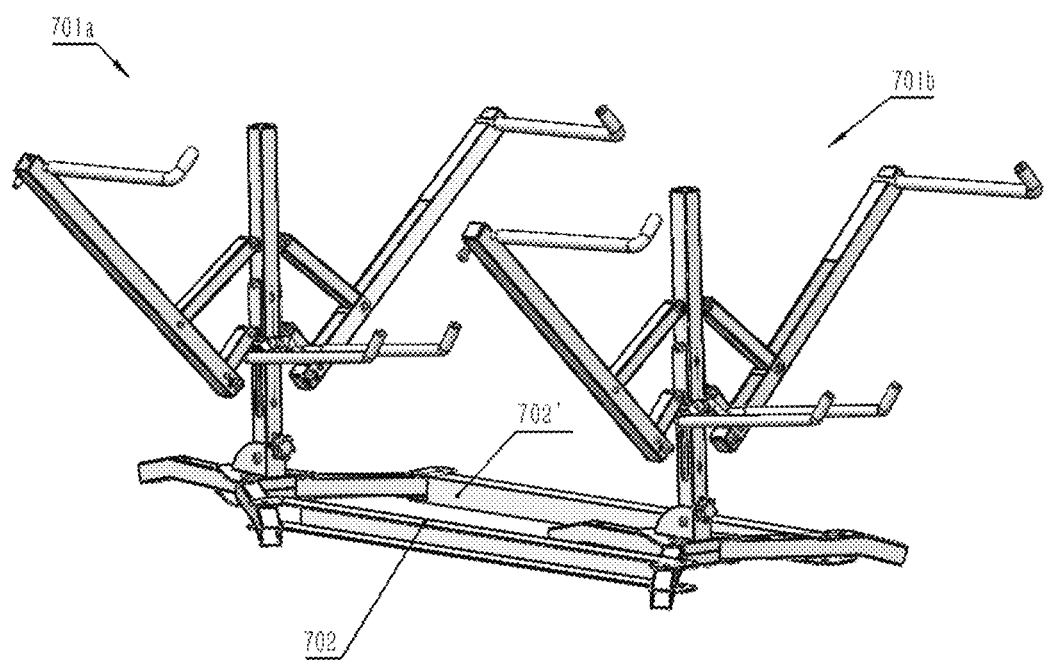
FIG. 7 is a schematic view of a multi-headed musical instrument stand according to one embodiment of the present disclosure.

FIG. 7 is a schematic view of a multi-headed musical instrument stand according to an embodiment of the present disclosure. As shown in FIG. 7, the multi-headed musical instrument stand includes two foldable musical instrument stands 701a and 701b which are connected together in series by two connecting rods 702, 702'.

The foldable instrument stands 701a and 701b of the embodiment shown in FIG. 7 are similar to those of the embodiment shown in FIG. 2 and will not be described in detail here.

The connecting rods 702, 702' are each independently a generally rod-shaped part having, for example, but not limited to, a circular or rectangular cross-section, and detachably connect the foldable musical instrument stands 701a and 701b together in series by, for example, but not limited to, snap-fitting, bolting, etc.

In the embodiment shown in FIG. 7, the multi-headed instrument stand includes two foldable instrument stands 701a and 701b. However, in some other embodiments of the present disclosure, the multi-headed instrument stand may include more foldable instrument stands, e.g., 701a, 701b . . . 701n, where n is an integer between 3 and 10.

In the embodiment shown in FIG. 7, the foldable instrument stands 701a and 701b have orientations on the same straight line. However, in some other embodiments of the present disclosure, the plurality of foldable musical instrument stands may also have orientations on lines different and parallel to one another.

The embodiment of FIG. 7 has at least the following advantages. Each foldable musical instrument stand in the multi-headed musical instrument stand defines a space for placing the musical instrument body by matching the limiting piece with the main supporting piece and the bracket, thereby providing good support for the musical instrument, and enabling the musical instrument to be firmly placed on the musical instrument stand without being prone to accidental falling and simultaneously not influencing the taking of the musical instrument; and the use of connecting rods to connect a plurality of foldable musical instrument stands together in series enables the placement of a plurality of musical instruments and further improves the integral structural stability of the musical instrument stands in use.

There are several points to be noted for this disclosure.

(1) The drawings of the disclosed embodiments relate only to the structures to which the disclosed embodiments relate, and other structures may refer to the general design.

(2) For the sake of clarity, in the drawings used to describe embodiments of the present disclosure, the thickness of layers or regions is enlarged or reduced, i.e., the drawings are not drawn to scale.

(3) Without conflicts, the embodiments of the present disclosure and features of the embodiments may be combined with one another to yield a new embodiment.

(4) The above are merely exemplary embodiments of the disclosure and are not intended to limit the scope of the disclosure, which is defined by the appended claims.

What is claimed is:

1. A foldable musical instrument stand, comprising a fixing structure and a supporting structure, wherein:
   the supporting structure comprises a main supporting piece, a first side supporting piece and a second side supporting piece, a first side connecting piece and a second side connecting piece, a first bracket and a second bracket;
   the main supporting piece is hinged with the fixing structure;
   two ends of the first side connecting piece are respectively hinged with the main supporting piece and the first side supporting piece;
   two ends of the second side connecting piece are respectively hinged with the main supporting piece and the second side supporting piece;
   the first bracket and the second bracket are both L-shaped, and hinged with the main supporting piece at long-edge terminals of the respective L-shapes, respectively; or the long-edge terminal of the L-shape of the first bracket is hinged to the first side supporting piece, and the long-edge terminal of the L-shape of the second bracket is hinged to the second side supporting piece;
   a first limiting piece hinged with the first side supporting piece is arranged at one end, far away from the first bracket, of the first side supporting piece, and a second limiting piece hinged with the second side supporting piece is arranged at one end, far away from the second bracket, of the second side supporting piece; and
   the main supporting piece, the first side supporting piece, the second side supporting piece, the first side connecting piece, the second side connecting piece, the first bracket, the second bracket, the first limiting piece and the second limiting piece each have an opening position and a folding position.

2. The foldable musical instrument stand according to claim 1, wherein the supporting structure further comprises a first auxiliary side connecting piece and a second auxiliary side connecting piece;
   two ends of the first auxiliary side connecting piece are respectively hinged with the main supporting piece and the first side supporting piece at positions different from the two ends of the first side connecting piece; and
   two ends of the second auxiliary side connecting piece are respectively hinged with the main supporting piece and the second side supporting piece at positions different from the two ends of the second side connecting piece.

3. The foldable musical instrument stand according to claim 2, wherein the main supporting piece further comprises a gravity self-locking structure;
   wherein the gravity self-locking structure comprises an elastic deformation part attached to the main supporting piece and a sliding part attached to the elastic deformation part, and the sliding part can slide along a length direction of the main supporting piece;
   the first bracket, the second bracket, the first auxiliary connecting piece and the second auxiliary connecting piece are respectively hinged to the sliding part;
   when a musical instrument is placed on the first bracket and the second bracket, the first bracket and the second bracket move downwards under the action of gravity of the musical instrument to drive the elastic deformation part to deform and the sliding part to move downwards so as to drive the first auxiliary connecting piece and the second auxiliary connecting piece to rotate, and thus the first limiting piece on the first side supporting piece and the second limiting piece on the second side supporting piece are moved towards a direction of the main supporting piece so as to lock a body of the musical instrument;
   when the musical instrument is removed from the musical instrument stand, the elastic deformation part at least partially recovers from the deformation, so that the sliding part moves upwards to drive the first auxiliary connecting piece and the second auxiliary connecting piece to rotate in an opposite manner when the musical instrument is placed on the musical instrument stand, and thus the first limiting piece on the first side supporting piece and the second limiting piece on the second side supporting piece are moved towards a direction away from the main supporting piece so as to release the body of the musical instrument.

4. The foldable musical instrument stand according to claim 3, wherein the main supporting piece is a cylinder having a side wall and a cavity surrounded by the side wall, and one or more elongated openings extending in a length direction of the cylinder are formed in the side wall,
   the elastic deformation part and the sliding part of the gravity self-locking structure are arranged in the cavity, and the first bracket, the second bracket, the first auxiliary connecting piece and the second auxiliary connecting piece are hinged with the sliding part by the one or more elongated openings.

5. The foldable musical instrument stand according to claim 3, wherein the main supporting piece is a column; and
the elastic deformation part and the sliding part of the gravity self-locking structure are arranged outside the column, and the sliding part at least partially surrounds the periphery of the column.

6. The foldable musical instrument stand according to claim 3, wherein the elastic deformation part is one or more selected from a tension spring, a compression spring, at least one elastic metal strip or sheet, and at least one elastic rubber strip or sheet.

7. The foldable musical instrument stand according to claim 3, further comprising a slide rail arranged on the main supporting piece for engagement with the sliding part.

8. The foldable musical instrument stand according to claim 3, wherein the sliding part is one or more selected from a metal slide, a plastic slide, a nylon slide, a sliding bearing, and a rolling bearing.

9. The foldable musical instrument stand according to claim 1, wherein the fixing structure is one or more selected from a base, a connecting rod and a hook.

10. The foldable musical instrument stand according to claim 9, wherein the base is one selected from a plate-type or a leg-type base;
wherein the leg-type base comprises a central connecting piece and at least three legs connected to the central connecting piece and extending radially outward from the central connecting piece, the lengths of the at least three legs are substantially the same, and at least two of the at least three legs are hinged with the central connecting piece, and the main supporting piece is hinged to the central connecting piece.

11. The foldable musical instrument stand according to claim 10, wherein
one or more locking structures are arranged at one or more of a joint of the fixing structure hinged with the main supporting piece, a joint of the first side connecting piece hinged with the main supporting piece, a joint of the first side connecting piece hinged with the first side supporting piece, a joint of the second side connecting piece hinged with the main supporting piece, a joint of the second side connecting piece hinged with the second side supporting piece, a joint of the first bracket hinged with the main supporting piece, a joint of the second bracket hinged with the main supporting piece, a joint of the first limiting piece hinged with the first side supporting piece, a joint of the second limiting piece hinged with the second side supporting piece, a joint of the leg hinged with the central connecting piece, a joint of the first auxiliary side connecting piece hinged with the main supporting piece, a joint of the first auxiliary side connecting piece hinged with the first side supporting piece, a joint of the second auxiliary side connecting piece hinged with the main sup- porting piece, a joint of the second auxiliary side connecting piece hinged with the second side supporting piece.

12. The foldable musical instrument stand according to claim 1, wherein at least one of the first limiting piece and the second limiting piece is L-shaped, and hinged to at least one of the respective first side supporting piece and the second side supporting piece at the long-edge terminal of the L-shape.

13. The foldable musical instrument stand according to claim 1, further comprising an auxiliary supporting piece against which the body of the musical instrument abuts, the auxiliary supporting piece is hinged with the main supporting piece and extends in the same direction as the first limiting piece and the second limiting piece, and the auxiliary supporting piece has a length less than the lengths of the first limiting piece and the second limiting piece.

14. The foldable musical instrument stand according to claim 1, wherein a bushing made of a flexible cushioning material is sleeved over at least one of the main supporting piece, the first bracket, the second bracket, the first limiting piece and the second limiting piece.

15. The foldable musical instrument stand according to claim 3, wherein the musical instrument is one or more selected from guitar, Bass, ukulele, violin, viola, violoncello, contrabass, Pipa, Ruan, Liuqin, Sanxian, Morin khuur and Dongbula.

16. A multi-headed musical instrument stand, comprising a plurality of foldable musical instrument stands according to claim 1 connected together in series by at least one connecting rod.

17. The multi-headed musical instrument stand according to claim 16, wherein the orientations of the plurality of foldable musical instrument stands are on the same line or on lines different from and parallel to each other.

18. The foldable musical instrument stand according to claim 2, wherein at least one of the first limiting piece and the second limiting piece is L-shaped, and hinged to at least one of the respective first side supporting piece and the second side supporting piece at the long-edge terminal of the L-shape.

19. The foldable musical instrument stand according to claim 3, wherein at least one of the first limiting piece and the second limiting piece is L-shaped, and hinged to at least one of the respective first side supporting piece and the second side supporting piece at the long-edge terminal of the L-shape.

20. The foldable musical instrument stand according to claim 2, further comprising an auxiliary supporting piece against which the body of the musical instrument abuts, the auxiliary supporting piece is hinged with the main supporting piece and extends in the same direction as the first limiting piece and the second limiting piece, and the auxiliary supporting piece has a length less than the lengths of the first limiting piece and the second limiting piece.

* * * * *